United States Patent Office 3,030,409
Patented Apr. 17, 1962

3,030,409
SECONDARY FLUOROALCOHOLS, ESTERS AND
PROCESS OF MAKING SAME
Sam Andreades and David Charles England, Wilmington, and Richard Vernon Lindsey, Jr., Hockessin, Del., assignors to E. I. du Pont de Nemours and Company, Wilmington, Del., a corporation of Delaware
No Drawing. Filed Jan. 29, 1960, Ser. No. 5,348
20 Claims. (Cl. 260—488)

This invention relates to a new class of alcohols and esters thereof. More particularly, it relates to a new class of secondary fluorinated alcohols, carboxylic acid esters thereof, and to a method for their preparation.

Fluorinated alcohols of various types, including secondary alcohols having fluorine substituents in hydrocarbyl radicals attached to the carbinol carbon, are known. However, secondary alcohols having a halogen attached to the carbinol carbon have been considered to be too unstable to be isolable.

A new class of fluorinated secondary alcohols having unusual properties is provided by this invention. These novel products are secondary α-haloalcohols of the formula

wherein X represents halogen, i.e., fluorine, chlorine, bromine or iodine, and R and R', which may be joined, are perhalocarbyl, or ω-hydroperhalocarbyl radicals, having fluorine attached to at least the carbons joined to the carbon bonded to oxygen. These products possess a greatly enhanced acidity (compared to secondary alcohols having no halogen attached to carbinol carbon) and they are extremely sensitive to moisture. The invention includes the carboxylic acid esters of these alcohols.

By "secondary alcohol" as used herein we mean an alcohol in which the carbon to which the alcoholic hydroxyl is attached is attached to two other carbons.

The secondary haloalcohols of this invention are prepared by the reaction of anhydrous hydrogen halides with haloketones of the formula

wherein R and R' have the meanings given above and hereinafter.

The reaction is conveniently carried out by contacting a fluoroketone of the above formula with an anhydrous hydrogen halide at a temperature below that at which the reaction product decomposes, e.g., at temperatures ranging from about 60° C. down to about —196° C. Preferably the reaction is carried out at temperatures between —80° C. and 0° C. Reaction between the fluoroketone and the hydrogen halide takes place practically instantaneously. However, the reaction mixture can be maintained at the reaction temperature for periods ranging from a few minutes up to several days.

The secondary haloalcohols of this invention are in equilibrium with the starting hydrogen halide and fluoroketone. At low temperatures the equilibrium is such that the predominant species present is the secondary haloalcohol and in some cases the alcohol exists to the extent of at least 99% in the equilibrium mixture. In some instantaneous the secondary haloalcohols can be distilled. At the higher temperatures, the equilibrium shifts and considerable or predominant amounts of fluoroketone and hydrogen halide may be present depending on the fluoroketone used.

Equimolar amounts of the fluoroketone and hydrogen halide are preferred for preparing the fluorinated secondary α-haloalcohols of this invention. However, a slight excess of the carbonyl compound, e.g., a 5% excess, can be used if desired. The use of a larger excess of the fluorocarbonyl compound favors the further reaction of the secondary haloalcohol formed in the reaction with another molecule of the fluoroketone to form a hemiketal as illustrated in Example II. Both products are formed in some cases and the use of equimolar amounts of the two reactants favors the formation of the haloalcohol.

The pressure under which the reaction is carried out is not critical, reaction pressures ranging from subatmospheric to superatmospheric being satisfactory. It is generally preferable to carry out the reaction at the autogenous pressure developed by the reactants and reaction products in the closed reaction vessel under the operating conditions.

The reaction can be carried out in conventional equipment that is constructed of materials that are not attacked by hydrogen halide. Examples of suitable materials of construction include "Monel" metal, polytetrafluoroethylene, and polyethylene. With hydrogen chloride, bromide, or iodide, normal materials such as glass can be used. The reaction vessels should be carefully dried before use and the reactants prevented from coming into contact with moisture from the atmosphere.

It is not necessary to employ a solvent or other reaction medium in the process of this invention. However, if desired an inert reaction medium can be used. Examples of suitable reaction media include hydrocarbons, e.g., pentane and cyclohexane, and chlorinated hydrocarbons, e.g., carbon tetrachloride.

The secondary α-haloalcohols of the invention may be reacted in a conventional manner with ketene, acid halides or acid anhydrides having up to twelve carbon atoms in a carbon chain to yield carboxylic acid esters.

This invention is illustrated in further detail by the following examples in which the proportions of ingredients are expressed in parts by weight unless otherwise noted.

EXAMPLE I

A dry reaction vessel constructed of "Monel" metal and having a capacity of 300 parts of water is cooled in a bath of liquid nitrogen and is charged with one part of anhydrous hydrogen fluoride and 20 parts of hexafluorocyclobutanone. Precautions are taken to exclude air and moisture. The reactor is closed and allowed to warm slowly to room temperature. After standing at room temperature for 15 hours, the absence of positive pressure in the reactor is noted. The reaction mixture is then vacuum-distilled in a dry, glass low-temperature still. Initially some crystalline solid (hexafluorocyclobutane-1,1-diol) appears on the walls of the coumn which probably results from the hydrolysis of the product by traces of absorbed moisture. As the distillation progresses, no further decomposition is evident. There is obtained as fraction 1 a colorless liquid boiling at 0° C./100 mm. amounting to 4 parts and fraction 2 boiling at 6° C./85 mm. amounting to 8 parts which crystallizes when cooled to —80° C. A brown liquid residue remains, which cannot be distilled and which darkens upon warming. Fraction 2 is analyzed, taking due precautions to insure dryness.

Analysis.—Calcd. for $C_4HF_7O$: C, 24.26%; H, 0.51%; F, 67.16%. Found: C, 24.59%, 24.56%; H, 0.68%, 0.87%; F, 68.92%, 68.96%.

The proton nuclear magnetic resonance spectrum displays a single peak and the fluorine nuclear magnetic resonance pattern is reasonable for the proposed structure. The infrared absorption spectrum of the fraction shows strong absorption at 3500 cm.$^{-1}$ (O-H stretching), and broad absorption centering at 1210 cm.$^{-1}$ (C-F). In addition, strong bands occur at 948 and 927 cm.$^{-1}$ which may be assigned to the cyclic C-O stretching mode. The over-all spectrum is quite simple, the only other bands of any consequence occurring at 1000 (strong), 853 (strong), 698 (weak), and 658 (weak) cm.$^{-1}$. The 1700 cm.$^{-1}$ carbonyl region is blank. These analytical data identify the product as heptafluorocyclobutanol.

The heptafluorocyclobutanol of Example I is readily hydrolyzed to hexafluorocyclobutane-1,1-diol. To a reaction vessel equipped with a reflux condenser and a dropping funnel is added 0.11 part of distilled water. Heptafluorocyclobutanol (1.17 parts) is then added dropwise. A vigorous reaction occurs with the evolution of white fumes of hydrogen fluoride. The warm liquid slowly recrystallizes into needles of hexafluorocyclobutane-1,1-diol amounting to 1.17 parts, or a yield of 100% of theory. Comparison of the infrared absorption spectrum of this product with the spectrum of authentic hexafluorocyclobutane-1,1-diol confirms the identification.

EXAMPLE II

A "Monel" reaction vessel of the type used in Example I is evacuated, is cooled in liquid nitrogen and charged with 1.496 parts of anhydrous hydrogen fluoride and 23.5136 parts of hexafluorocyclobutanone. After evacuating the reactor to 0.2 mm. mercury pressure at $-196°$ C., the vessel is closed and allowed to warm slowly to room temperature for about 15 hours. The reaction product is distilled at a reduced pressure. After collecting a small amount of forerun, all the product distills as a colorless liquid, B.P. $-21°$ C./0.05 mm., which displays a single proton nuclear magnetic resonance peak, and a reasonable fluorine n-m-r pattern.

*Analysis.*—Calcd. for $C_8HF_{13}O_2$: C, 25.55%; H, 0.27%; F, 65.65%. Found: C, 25.73%, 26.13%; H, 0.47%, 0.65%; F, 65.64%, 65.07%, 64.63%.

The infrared absorption spectrum of this product shows strong O-H absorption at 3730 cm.$^{-1}$, strong C-F absorption at 1370–1110 cm.$^{-1}$ and strong cyclic C-O absorption at 1020–925 cm.$^{-1}$. The 1700 cm.$^{-1}$ carbonyl region is blank. These data identify the product as 1-heptafluorocyclobutoxyhexafluoro-1-cyclobutanol, having the formula:

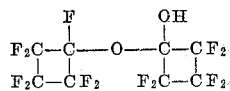

EXAMPLE III

Heptafluorocyclobutanol, freshly prepared from 1.54 parts of anhydrous hydrogen fluoride and 12.77 parts of hexafluorocyclobutanone, by a procedure similar to that described in the above examples, is distilled (B.P. 57° C.) into a dry glass reaction vessel fitted with a reflux condenser and a drying tube filled with anhydrous calcium sulfate. Excess ketene is bubbled through the liquid and an exothermic reaction occurs which causes the mixture to reflux (about 80–90° C.). When the mixture cools, indicating no further reaction, the addition of ketene is stopped. Distillation of the resultant reddish liquid gives 4 parts of colorless heptafluorocyclobutyl acetate, $n_D^{24}$, 1.3183, the bulk of which boils at 99–101° C. The overall yield for the two steps is 24% based on the starting ketone.

*Analysis.*—Calc'd for $C_6H_3F_7O_2$: C, 30.02%; H, 1.26%; F, 55.40%. Found: C, 30.92%; H, 1.53%; F, 54.55%.

This ester is insoluble in water and the water extract gives a negative test for fluoride ion. The infrared absorption spectrum of this ester is consistent with the proposed structure, the carbonyl band occurring at 5.49 microns. A small amount of diketene impurity is indicated. The fluorine nuclear magnetic resonance spectrum is also reasonable for the above structure.

EXAMPLE IV

To a polyethylene reaction vessel equipped with a glass inlet tube and an exit tube protected from the atmosphere by granular anhydrous calcium sulfate is added 31 parts of sym-dichlorotetrafluoroacetone. The reaction vessel is cooled in an ice bath and stirred magnetically while 2.9 parts of anhydrous hydrogen fluoride is slowly introduced through the gas inlet tube during a period of about 30 minutes. An infrared absorption spectrum of the resulting product displays strong O-H absorption at 3570 cm.$^{-1}$ as well as some carbonyl absorption (this latter indicating the presence of excess starting ketone). Distillation of the reaction product at reduced pressure gives about 16 parts of an extremely moisture-sensitive alcohol, B.P. 3° C./20 mm. The infrared absorption spectrum of the distilled product displays strong O-H absorption at 3570 cm.$^{-1}$. This product is 1,3-dichloro-1,1,2,3,3-pentafluoro-2-propanol. The presence of some starting ketone impurity in this distilled product is indicated by infrared absorption 1800 cm.$^{-1}$.

EXAMPLE V

Anhydrous hydrogen chloride (3.0 parts) and perfluorocyclobutanone (16.0 parts) are distilled into a thick walled glass tube (having a capacity of 150 parts of water) cooled in liquid nitrogen. The tube is sealed and allowed to warm to room temperature. The pale yellow mixture in the tube then undergoes a slightly exothermic reaction and becomes colorless. After cooling in a mixture of solid carbon dioxide and acetone, the tube is opened and the contents are distilled at atmospheric pressure. There is obtained 15.8 parts (90% of theory) of 1-chloroperfluorocyclobutanol, (also named 1-chloro-2,2,-3,3,4,4-hexafluorocyclobutanol) B.P. 68° C., $n_D^{25}$, 1.3341. The infrared absorption spectrum and nuclear magnetic resonance spectrum obtained on this product confirm the indicated structure.

*Analysis.*—Calc'd for $C_4HF_6ClO$: C, 22.4%; H, 0.5%; F, 53.1%; Cl, 16.5%. Found: C, 23.1%; H, 0.9%; F, 52.5%; Cl, 16.4%.

EXAMPLE VI

Monomeric ketene is bubbled into 8 parts of 1-chloroperfluorocyclobutanol whereupon an exothermic reaction takes place. After the temperature of the reaction mixture drops from a maximum of 95° C. to 60° C., addition of ketene is stopped and the mixture is distilled. There is obtained 6.9 parts (72% of theory) of 1-chloroperfluorocyclobutyl acetate, B.P. 122° C., $n_D^{25}$, 1.3470.

*Analysis.*—Calc'd for $C_6H_3F_6ClO_2$: C, 28.1%; H, 1.2%; F, 44.4%; Cl, 13.8%. Found: C, 29.7%; H, 1.3%; F, 46.7%; Cl, 11.4%.

The infrared absorption spectrum and the nuclear magnetic resonance spectrum obtained on this ester confirm the indicated structure.

EXAMPLE VII

Using the procedure described in Example V, 7 parts of anhydrous hydrogen bromide and 20 parts of perfluorocyclobutanone are reacted in a sealed glass tube. The reaction is slightly exothermic and the mixture becomes colorless. On distillation of the reaction mixture, there is obtained 19.7 g. (88% of theory) of 1-bromoperfluorocyclobutanol (also named 1-bromo-2,2,3,3,4,4-hexafluorocyclobutanol), B.P. 85° C., $n_D^{25}$, 1.3620.

*Analysis.*—Calc'd for $C_4HF_6BrO$: C, 18.6%; H, 0.4%; F, 44.0%; Br, 30.9%. Found: C, 19.1%; H, 0.7%; F, 44.5%; Br, 30.6%.

The infrared absorption spectrum and the nuclear magnetic resonance spectrum obtained on this ester are consistent with the proposed structure.

EXAMPLE VIII

Ketene is bubbled into 11 parts of 1-bromoperfluorocyclobutanol with the reaction temperature held below 60° C. by means of an ice bath. When the exothermic reaction ceases, the product is distilled and there is obtained 10.7 parts (84% of theory) of 1-bromoperfluorocyclobutyl acetate, B.P. 132° C., $n_D^{25}$, 1.3688.

*Analysis.*—Calc'd for $C_6H_3F_6BrO_2$: C, 23.9%; H, 1.0%; F, 37.9%; Br, 26.5%. Found: C, 24.8%; H, 1.2%; F, 39.1%; Br, 24.6%.

The infrared absorption spectrum and the nuclear magnetic resonance spectrum obtained on this ester are consistent with the indicated structure.

EXAMPLE IX

A mixture of 15 parts of anhydrous hydrogen iodide and 20 parts of perfluorocyclobutanone is frozen in a thick walled glass tube (having a capacity of 150 parts of water) at liquid nitrogen temperature. The tube is sealed and then placed in a bath of a mixture of ice and salt at −15° C. An exothermic reaction takes place and some iodine separates from the mixture. The liquid product is filtered from the iodine and the filtrate is distilled. Nearly all of the mixture boils at 66° C./115 mm. and there is obtained 26 parts (75% of theory) of 1-iodoperfluorocyclobutanol (also named 1-iodo-2,2,3,3,4,4-hexafluorocyclobutanol) which is deeply colored with iodine. This material is shaken with mercury to remove the iodine and then redistilled. There is obtained 21.5 parts of redistilled alcohol which is again treated with mercury and redistilled to give 16.4 parts of product with only a pale pink color. Refractive index, $n_D^{25}$, of this redistilled material is 1.3997.

*Analysis.*—Calc'd for $C_4HF_6IO$: C, 15.7%; H, 0.3%; F, 37.2%; I, 41.5%. Found: C, 17.2%; H, 0.6%; F, 40.0%; I, 33.7%.

The infrared absorption spectrum and the nuclear magnetic resonance spectrum obtained on this ester are consistent with the proposed structure.

EXAMPLE X

Ketene is bubbled through 14 parts of 1-iodoperfluorocyclobutanol for 15 minutes, and then stopped (even though the reaction is exothermic from dimerization of ketene). Distillation of the crude reaction mixture gives 13 parts (82.5% of theory) of 1-iodoperfluorocyclobutyl acetate, B.P. 68° C./25 mm. contaminated with iodine. The product is shaken with mercury to remove iodine and then redistilled. The refractive index, $n_D^{25}$, of the redistilled product is 1.4085.

*Analysis.*—Calc'd for $C_6H_3F_6IO_2$: C, 20.7%; H, 0.9%; F, 32.8%; I, 36.5%. Found: C, 21.5%; H, 1.1%; F, 33.6%; I, 31.4%.

The infrared absorption spectrum and the nuclear magnetic resonance spectrum obtained on this ester are in agreement with the proposed structure.

The examples have illustrated this invention by reference to the preparation of certain secondary α-haloalcohols and esters thereof. However, this invention includes any secondary α-haloalcohol of the formula:

wherein X represents a halogen and R and R', which may be joined, are perhalocarbyl or ω-hydroperhalocarbyl radicals having fluorine attached to at least the carbons joined to the carbinol carbons. Preferably, the perhalocarbyl and ω-hydroperhalocarbyl groups are saturated aliphatic or cycloaliphatic groups having no more than twelve carbon atoms. Still more preferably the carbon atoms in R and R' do not exceed a total of eight. Thus R and R', which can be the same or different, may be trifluoromethyl, dibromofluoromethyl, pentafluoroethyl, ω-hydroperfluorobutyl, difluoromethyl, undecafluorocyclohexyl, etc. or may be joined as

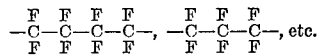

Examples of other specific secondary α-fluoroalcohols that are included in this invention are listed in Table I. The specific fluoroketones which are reacted with hydrogen fluoride to prepare the α-fluoroalcohols are also listed in the table.

Table I

| α-Fluoroketone | Secondary α-Fluoroalcohol |
| --- | --- |
| 1,1,3,3-tetrafluoro-2-propanone | 1,1,2,3,3-pentafluoro-2-propanol. |
| 1,1-dibromo-1,3,3,3-tetrafluoro-2-propanone. | 1,1-dibromo-1,2,3,3,3-pentafluoro-2-propanol. |
| hexafluoro-2-propanone | heptafluoro-2-propanol. |
| octafluoro-2-butanone | nonafluoro-2-butanol. |
| decafluoro-2-pentanone | undecafluoro-2-pentanol. |
| dodecafluoro-3-hexanone | tridecafluoro-3-hexanol. |
| tetradecafluoro-4-heptanone | pentadecafluoro-4-heptanol. |
| octafluorocyclopentanone | nonafluorocyclopentanol. |
| 2-chloropentafluoro-1-cyclobutanone. | 2-chlorohexafluoro-1-cyclobutanol. |
| 2-bromo-2-chlorotetrafluoro-1-cyclobutanone. | 2-bromo-2-chloropentafluoro-1-cyclobutanol. |
| 2,2-dibromotetrafluoro-1-cyclobutanone. | 2,2-dibromopentafluoro-1-cyclobutanol. |
| 1,7-dihydrododecafluoro-3-heptanone. | 1,7-dihydrotridecafluoro-3-heptanol. |
| 1-hydropentafluoro-2-propanone | 1-hydrohexafluoro-2-propanol. |
| undecafluorocyclohexyl trifluoromethyl ketone. | 1-undecafluorocyclohexyl-1,2,2,2-tetrafluoro-1-ethanol. |
| 1,1,3,3-tetrachloro-1,3-difluoro-2-propanone. | 1,1,3,3-tetrachloro-1,2,3-trifluoro-2-propanol. |
| 1,9-dihydroperfluoro-5-nonanone | 1,9-dihydroperfluoro-5-nonanol. |

By reacting the fluoroketones of Table I with other hydrogen halides such as HCl, HBr and HI, there are produced the corresponding secondary α-haloalcohols wherein the halogen attached to the carbinol carbon is that supplied by the particular hydrogen halide used. The alcohols may be reacted with ketene to form the acetates and with carboxylic acid halides or anhydrides to form esters wherein the carboxylic acid residue contains up to 12 carbon atoms. Exemplary of suitable acid halides and anhydrides are propionic, butyric, valeric, and lauric anhydrides and propionyl chloride, butyryl bromide, caproyl chloride, capryl chloride, etc. Among the resulting esters there may be mentioned 1-chloroperfluorocyclobutyl butyrate and laurate, undecafluoro-2-pentyl caprylate, 1,9-dihydroperfluoro-5-nonyl propionate, etc.

The halofluoroketones used as starting materials in the process of this invention can be made by various known methods. Some of the methods for preparing these compounds are disclosed by Lovelace, Rausch, and Postelnek, "Aliphatic Fluorine Compounds," Chapter VI, Reinhold Publishing Corp., New York, (1958). Various chlorofluorocyclobutanones are disclosed in U.S. Patents 2,712,-554, and -5. Perfluorocyclobutanone is a new compound per se and is being claimed in U.S. application Serial No. 757,701, filed August 28, 1958 by D. C. England, as a continuation-in-part of application Serial No. 717,805, filed February 27, 1958 and now abandoned. All of the polyfluorohalocyclobutanones can be readily prepared by the cycloaddition reaction between perfluorovinyl hydrocarbyl ethers with the appropriate 1,1-dihalo-2,2-difluoroethylenes followed by the hydrolysis of the resultant 1-hydrocarbyl - 1,3,3,4,4 - pentafluoro-2,2-dihalocyclobutanes. More specifically, perfluorocyclobutanone can be prepared by the following series of reactions: sodium methoxide and tetrafluoroethylene in dioxane solution are reacted at 100° C. under pressures of 300 lb./sq. in. to form methyl trifluorovinyl ether. This methyl trifluorovinyl ether is then reacted with tetrafluoroethylene in the presence of a polymerization inhibitor at 150° C. for 12 hours. The resulting perfluorocyclobutyl methyl ether is then heated with concentrated sulfuric acid in a closed reaction vessel at 150° C. for 12 hours to form perfluorocyclobutanone hydrate. The free perfluorocyclobutanone is obtained from the hydrate by treatment with phosphorus pentoxide. Perfluoroalkyl ketones can be prepared by reaction of sodium with alkyl esters of perfluoroalkane carboxylic acids in ether solution followed by acidification, as described by Hauptschein et al., J. Am. Chem. Soc. 77, 4930 (1955).

The secondary α-haloalcohols of this invention are useful in various applications. The secondary α-haloalcohols lose hydrogen halide readily and revert to the starting ketones. The secondary α-haloalcohols of this invention having fluorine attached to the carbinol carbon or their equilibrium mixtures with hydrogen fluoride and the fluoroketones are especially useful as a source of hydrogen fluoride, and they can be stored in dry, glass containers until ready for use. Consequently, the equilibrium system of

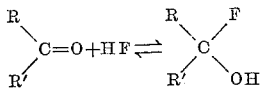

for example, is especially valuable as an in situ preparation and use of the α-fluoro secondary alcohol to make useful derivatives of the alcohol. The secondary α-haloalcohols in general can be used to provide a controlled in situ liberation of hydrogen halide for addition to an olefin or to serve as a catalyst. The controlled liberation of hydrogen halide can be accomplished by the controlled addition of water vapor to the secondary α-haloalcohol. Surprisingly, many of the secondary α-haloalcohols are quite stable in the absence of water and may readily be isolated in relatively pure form.

The secondary α-haloalcohols are also useful as solvents for tetrafluoroethylene polymers. The carboxylic acid esters share this utility. For example, low molecular weight polytetrafluoroethylene is soluble at room temperature in 1-haloperfluorocyclobutanols such as 1-chloro-, 1-bromo-, or 1-iodoperfluorocyclobutanol or heptafluorocyclobutanol or esters thereof such as 1-chloroperfluorocyclobutyl acetate, 1-bromoperfluorocyclobutyl acetate and 1-iodoperfluorocyclobutyl acetate. A 2% solution of low molecular weight polytetrafluoroethylene in heptafluorocyclobutanol is especially useful for impregnation of paper followed by evaporation of the solvent to leave a water-repellent paper.

What is claimed is:

1. Secondary fluoroalcohols of the formula

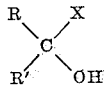

wherein X is halogen; R and R', taken individually, are selected from the group consisting of saturated aliphatic perhalocarbyl, saturated aliphatic ω-hydroperhalocarbyl and saturated cycloaliphatic perhalocarbyl radicals of up to 12 carbon atoms, said radicals having fluorine attached to at least the carbons joined to carbinol carbon; and R and R', taken together, are saturated aliphatic perhalocarbyl of 3–4 carbon atoms.

2. The secondary fluoroalcohols of claim 1 wherein X is fluorine.
3. The secondary fluoroalcohols of claim 1 wherein X is chlorine.
4. The secondary fluoroalcohols of claim 1 wherein X is bromine.
5. The secondary fluoroalcohols of claim 1 wherein X is iodine.
6. Carboxylic acid esters of the alcohols of claim 1 in which the carboxylic acid residue contains up to 12 carbon atoms.
7. The method of preparing the secondary fluoroalcohols of claim 1 which comprises reacting anhydrous hydrogen halide with a haloketone of the formula

wherein R and R' are as defined in claim 1, at a temperature below that at which the reaction product decomposes.
8. The process of claim 7 wherein the haloketone and hydrogen halide are present in equimolar amounts and the reaction is carried out under autogenous pressure at a temperature between −80° C. and 0° C.
9. The process of claim 7 wherein the hydrogen halide is hydrogen iodide.
10. The process of claim 7 wherein the hydrogen halide used is hydrogen fluorine.
11. The reaction of claim 7 wherein the hydrogen halide used is hydrogen chloride.
12. The reaction of claim 7 wherein the hydrogen halide used is hydrogen bromide.
13. The process of claim 7 wherein the haloketone used is hexafluorocyclobutanone.
14. The process of claim 7 wherein the haloketone is sym-dichlorotetrafluoroacetone.
15. Heptafluorocyclobutanol.
16. Heptafluorocyclobutyl acetate.
17. 1-chloroperfluorocyclobutanol.
18. 1-bromoperfluorocyclobutanol.
19. 1-iodoperfluorocyclobutanol.
20. 1,3-dichloro-1,1,2,3,3-pentafluoro-2-propanol.

No references cited.